(12) United States Patent
Kothandaraman

(10) Patent No.: US 7,877,422 B2
(45) Date of Patent: Jan. 25, 2011

(54) METHOD AND SYSTEM FOR PROCESSING 1:N RELATIONSHIPS BETWEEN DATA OBJECT NODES

(75) Inventor: Ramprasadh Kothandaraman, Karnataka (IN)

(73) Assignee: SAP AG, Walldorf (DE)

( * ) Notice: Subject to any disclaimer, the term of this patent is extended or adjusted under 35 U.S.C. 154(b) by 523 days.

(21) Appl. No.: 11/769,188

(22) Filed: Jun. 27, 2007

(65) Prior Publication Data

US 2009/0006443 A1  Jan. 1, 2009

(51) Int. Cl.
*G06F 7/00* (2006.01)
*G06F 17/30* (2006.01)

(52) U.S. Cl. .................................................. 707/809
(58) Field of Classification Search .................. None
See application file for complete search history.

(56) References Cited

U.S. PATENT DOCUMENTS

| | | | |
|---|---|---|---|
| 5,937,402 A * | 8/1999 | Pandit | 707/4 |
| 6,728,726 B1 * | 4/2004 | Bernstein et al. | 707/103 R |
| 2005/0165864 A1 * | 7/2005 | Martino | 707/202 |

* cited by examiner

*Primary Examiner*—Sathyanarayan Pannala

(57) ABSTRACT

Embodiments of the invention are generally directed to a method and system for processing 1:N relationships between data object nodes. A first data object and a second data object is provided wherein a first node of the first data object has a 1:N relation with a second node of the second data object. The first node includes a first sync key uniquely identifying a field in the first node. The second node includes n second sync keys, each of the n second sync keys uniquely identifying a field in the second node. A shadow node is generated in the first data object. The 1:N relation is de-normalized to generate 1:1 associations between the first node and the second node, the 1:1 associations being stored in shadow node.

20 Claims, 5 Drawing Sheets

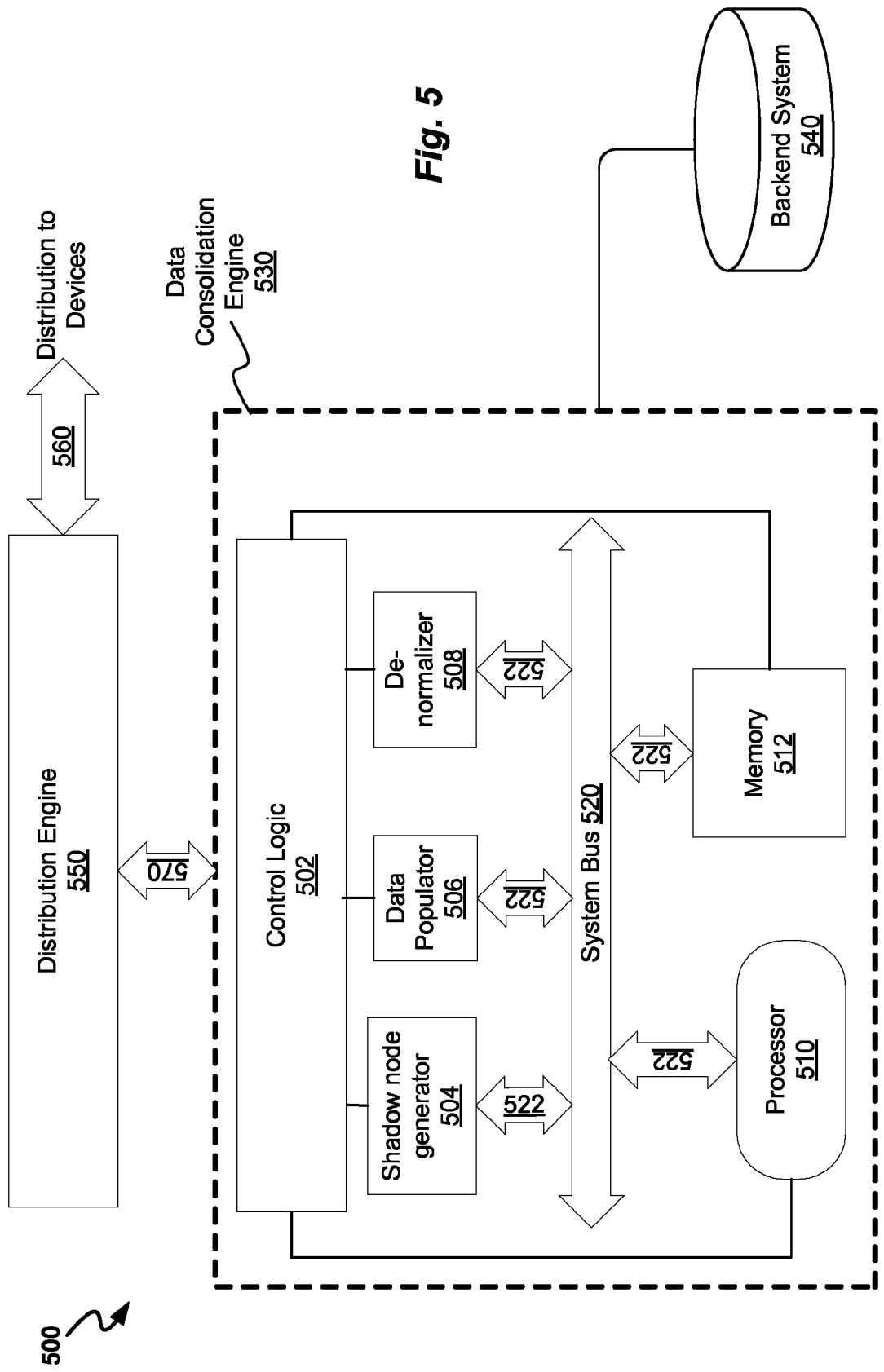

METHOD AND SYSTEM FOR PROCESSING 1:N RELATIONSHIPS BETWEEN DATA OBJECT NODES

TECHNICAL FIELD

Embodiments of the invention generally relate to computer systems, and more particularly, to a method and system for processing 1:N associations between data object nodes.

BACKGROUND

Information distribution is needed in various scenarios to facilitate business operations. Typically, information is gathered from a plurality of sources, such as user and product databases, and sent to a number of devices, such as computer terminals and personal digital assistants, connected to a distribution system. The distribution system, generally, identifies sets or clusters within a chunk of data and distributes the data to individual devices. The distribution system typically includes a data definition including data objects or business objects. Data objects usually have a hierarchical structure where every level in the hierarchy is a node. Each node typically includes a number of fields. Data is packed into this hierarchical structure as data object instances. The data is generally distributed to a user in the form of data object instances.

Dependencies exist between one or more data objects in various scenarios and there is a need for distributing one or more dependent data object instances to the user if a parent data object is to be distributed to the user. These dependencies between data objects are typically captured as associations. Each field in a node generally includes one or more keys that uniquely identify the field. A referring node of a data object generally includes all the keys of a referred node there by creating a 1:1 relationship from the referring node perspective. But there are scenarios where the referring node includes only a subset of keys of the referred node resulting in a 1:N relationship. In the currently existing distribution systems, the 1:N relationships are typically handled by the distribution system. A data set for distribution is calculated at runtime by the distribution system on receiving distribution requests from the user. Thus the complexity of the 1:N relationships and the runtime calculation of the data set results is an increased load upon the distribution system affecting the distribution system performance.

SUMMARY OF THE INVENTION

Embodiments of the invention are generally directed to a method and system for processing 1:N relationships between data object nodes. A first data object and a second data object is provided wherein a first node of the first data object has a 1:N relation with a second node of the second data object. The first node includes a first sync key uniquely identifying a field in the first node. The second node includes n second sync keys, each of the n second sync keys uniquely identifying a field in the second node. A shadow node is generated in the first data object. The 1:N relation is de-normalized to generate 1:1 associations between the first node and the second node, the 1:1 associations being stored in shadow node.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

FIG. 5 is a block diagram of an exemplary implementation of a distribution system according to an embodiment of the invention.

DETAILED DESCRIPTION

Embodiments of the invention are generally directed to a method and system for processing 1:N relationships between data object nodes. A first data object and a second data object is provided wherein a first node of the first data object has a 1:N relation with a second node of the second data object. The first node includes a first sync key uniquely identifying a field in the first node. The second node includes n second sync keys, each of the n second sync keys uniquely identifying a field in the second node. A shadow node is generated in the first data object. The 1:N relation is de-normalized to generate 1:1 associations between the first node and the second node, the 1:1 associations being stored in shadow node.

Figure 1:
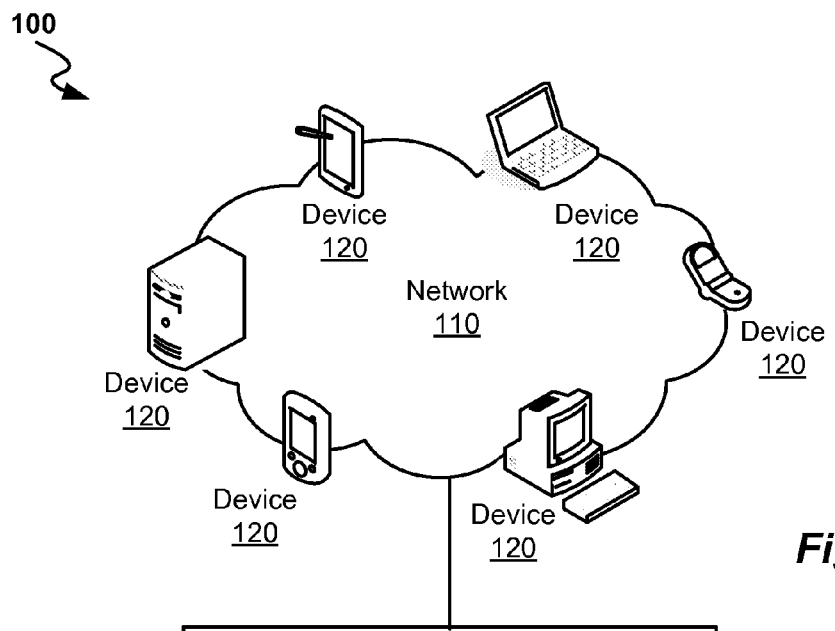
FIG. 1 is a functional block diagram of a typical distribution system according to an embodiment of the invention.
Figure 1:
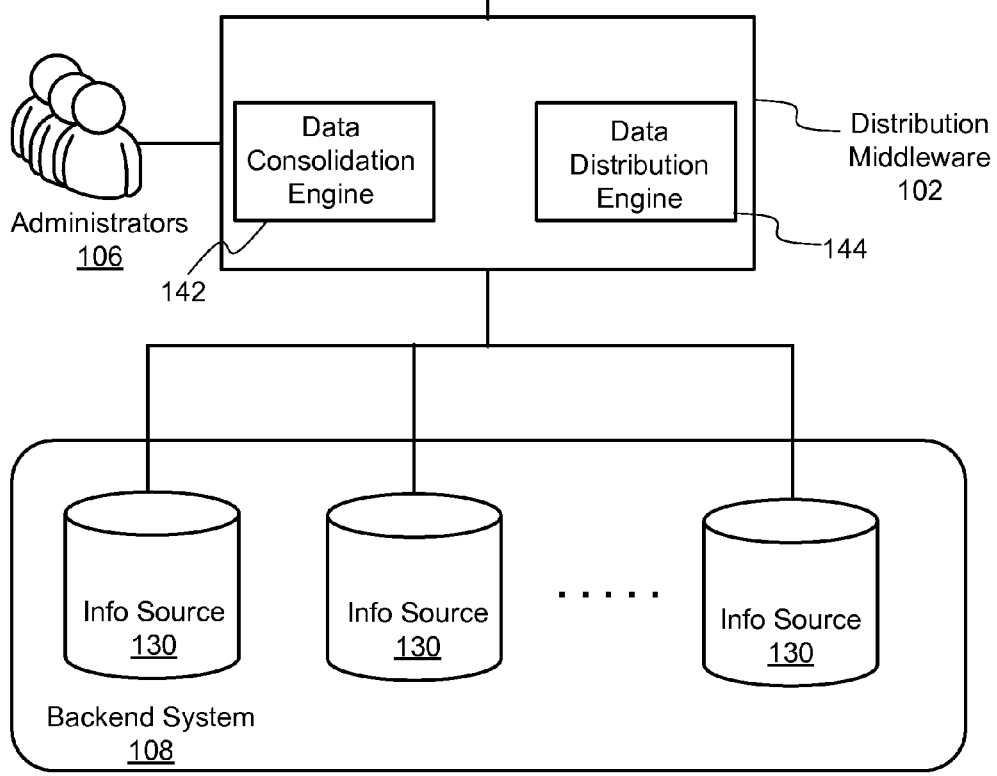

FIG. 1 is a functional block diagram of a typical distribution system according to an embodiment of the invention. A number of devices 120 are connected to network 110. Network 110 connects devices 120 to backend system 108 through distribution middleware 102. Distribution middleware 102 is typically responsible for data consolidation and data distribution to devices 120. Distribution middleware 102 generally includes data consolidation engine 142 and data distribution engine 144 to carry out data consolidation and day distribution respectively. Each device 120 has a set of consumer characteristics based upon which middleware 102 decides a subset of information to be distributed to the device 120. Please note that the words data and information shall be used interchangeably. Data consolidation generally includes collecting the data from backend 108 based upon the consumer characteristics of devices 120 and storing the data. Data distribution generally includes extracting the data relevant to devices 120 from the consolidated data and actually distributing the data to devices 120. Distribution middleware 102 typically provides application tools to enable administrators 106 to configure distribution middleware 102 in order to provide a number of services such as generation and registration of new devices 120, setting up the consumer characteristics for each device 120, configuration for providing device 120 search services and the like. Backend system 108 may include one or more information sources 130 from which the data may be collected and distributed by distribution middleware 102 to devices 120. Information sources 130 typically store the data in data objects. Devices 120 may be selected from an array of devices such as servers, personal digital assistants, mobile phones, personal computers, laptops and the like.

Distribution middleware 102 typically includes the data objects for each data table stored in backend system 108. Each row of the data table stores one data record. The data objects usually have a hierarchical structure having a number of hierarchical levels wherein each hierarchical level is a node. The data objects typically have a root node at a top most level in the hierarchical structure. Each node may include associated child nodes. A node may store the data either for a single data record or multiple data records of a data table.

Distribution middleware 102 typically generates and stores a middleware table linked to each data object. The middleware table generally has a number of columns, each column being linked to a node or a field in the node of the data object. Further each row of the middleware table includes data stored by the node. Each node of a data object typically includes a number of keys uniquely identifying the node. Each key may include one or more backend keys or sync keys. The backend keys are the keys generated by a backend application to uniquely identify a row in a backend data table stored in backend system 108. A backend key for a row may either be a record in one column or a combination of records in multiple columns in the data table. Sync keys are generally generated by distribution middleware 102 to uniquely identify a row in the middleware table.

Relationships typically exist between nodes of two or more data objects. Data consolidation engine 142 typically generates associations between the nodes of two or more data objects based upon the relationships. A referring node in an association between two nodes is typically the node having either all or a subset of the backend keys of the referred node. The associations may include backend key associations or sync key associations. A backend key association is typically between the backend keys of two nodes. The sync key association is typically between the sync keys of two nodes.

Figure 2:
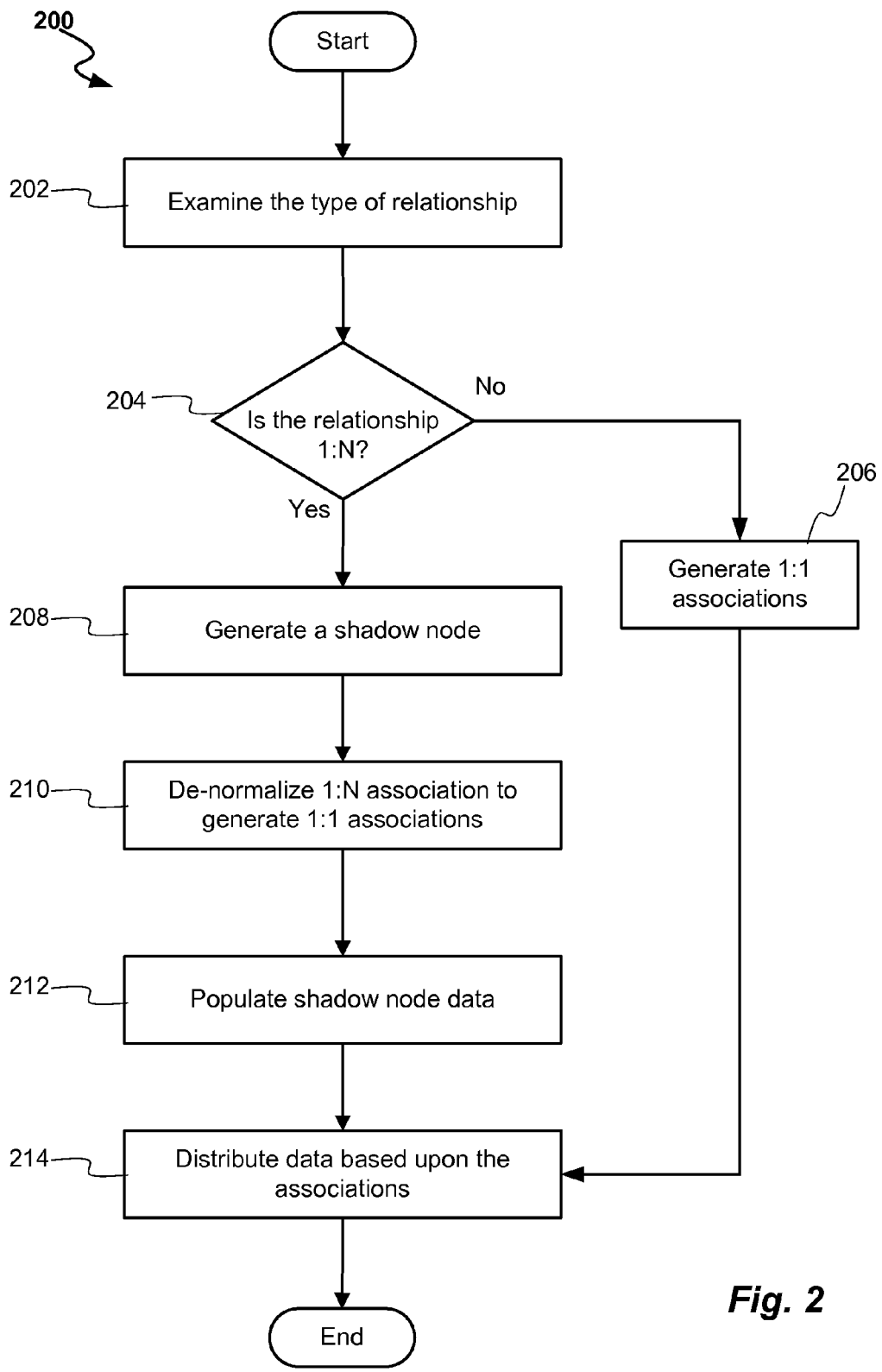
FIG. 2 is a flow diagram of a process for processing a 1:N relationship according to an embodiment of the invention.

FIG. 2 is a flow diagram of a process 200 for processing a 1:N relationship according to an embodiment of the invention. A 1:N relationship typically exists between a referring node and a referred node when the referring node includes only a subset of the backend keys of the referred node. In process block 202, the type of relationship existing between two nodes of data objects is examined. In decision block 204, if the type of relationship is not a 1:N relationship, process 200 moves to process block 206 where 1:1 associations are generated between the backend keys and sync keys of the nodes. Process 200 then moves to process block 214 wherein data is distributed to users based upon the generated associations. In decision block 204, if the type of relationship existing between the nodes is a 1:N relationship, process 200 moves to process block 208 wherein a shadow node is generated in the referring data object. In process block 210, the 1:N relationship is de-normalized and 1:1 associations are generated between the sync key of the referring node and the sync keys of the referred node. The shadow node typically stores the de-normalized 1:1 associations. In process block 212, the shadow node data is populated. The shadow node data is typically the sync key associations and the sync keys of the referring and the referred nodes themselves. The shadow node data is generally populated whenever a new instance of referred node or referring node is added or whenever an existing instance of the referred node or referring node is deleted or updated. In process block 214, data is distributed to a users based upon the associations stored in the shadow node. Process 200 is then terminated.

Figure 3:
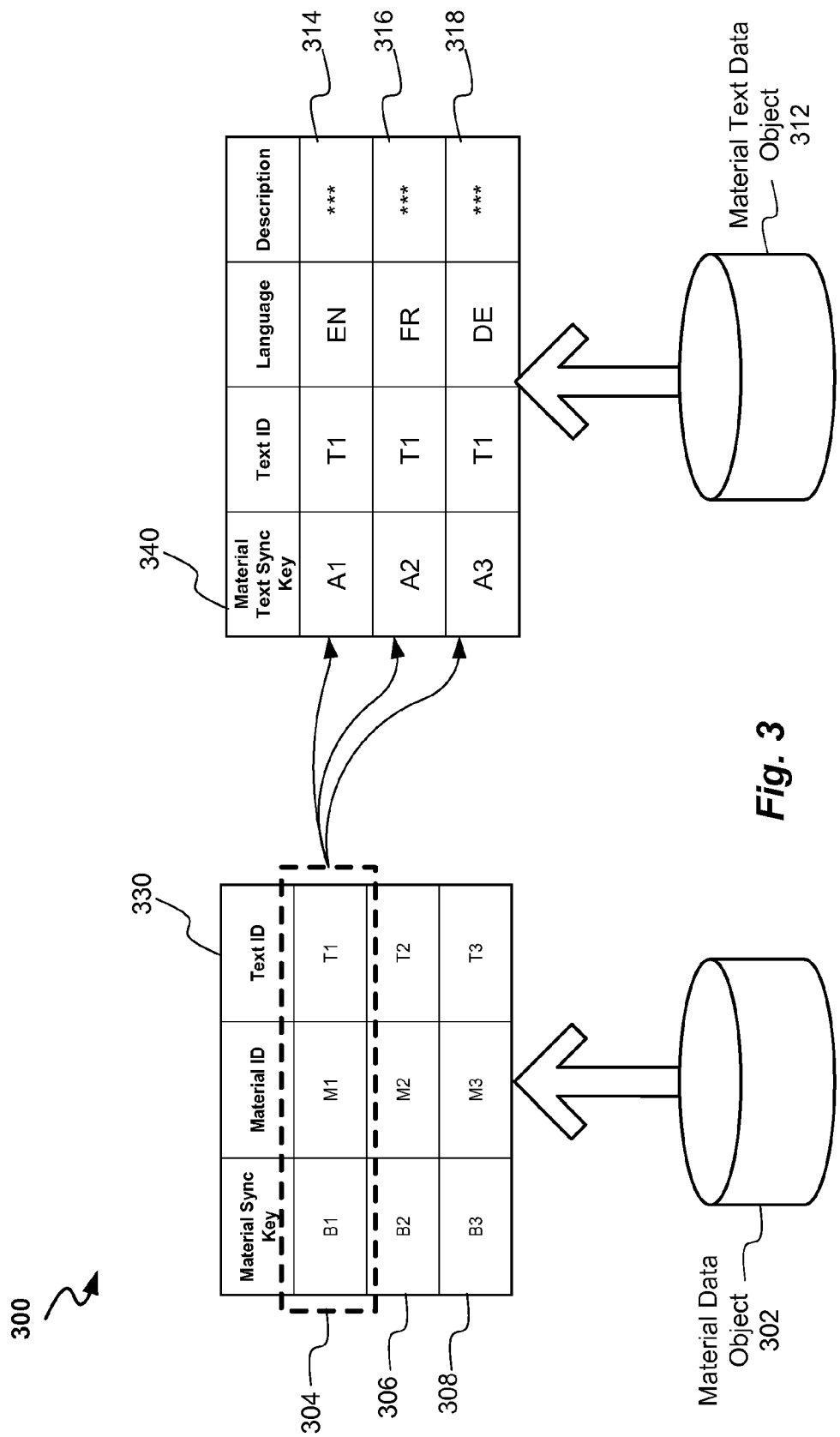
FIG. 3 is an illustration of a 1:N relationship between a material data object and a material text data object according to an embodiment of the invention.

FIG. 3 is an illustration 300 of a 1:N relationship between a material data object and a material text data object according to an embodiment of the invention. Middleware table 330 is a middleware table for a line item node of material data object 302. Middleware table 340 is a middleware table for the root node of material text data object 312. Records 304, 306 and 308 are stored as separate instances of material data object 302. Similarly, records 314, 316 and 318 are stored as separate instances of material text data object 312. Middleware table 330 includes columns Sync Key, Material and Text ID. The Material ID column stores a unique material identifier for a material. Text ID column stores a text identifier for a material. Each text identifier points to a text used to identify a material. Sync Key column of middleware table 330 stores a unique sync key for each of the records 304, 306 and 308. Middleware table 340 includes columns Sync Key, Text ID, Language and Description. Text ID column stores a text identifier. Language column stores a language identifier, identifying the language in which a corresponding text for a text identifier is stored. Description column stores the actual text used to identify a material. A1, A2 and A3 are the unique sync keys stored by Sync Key column of middleware table 340. For example in record 314 a text is stored in English language (EN) for Text ID, T1. A 1:N relationship exists between middleware table 330 and middleware table 340. In record 304, a material having Material ID, M1 is represented by a text having Text ID, T1. Record 314 stores the text for M1 in English language (EN), record 316 stores the text for M1 in French language (FR) and record 318 stores the text for M1 in German language (DE). Thus record 304 of middleware table 330 has a 1:N relationship with records 314, 316 and 318 of middleware table 340.

Figure 4:
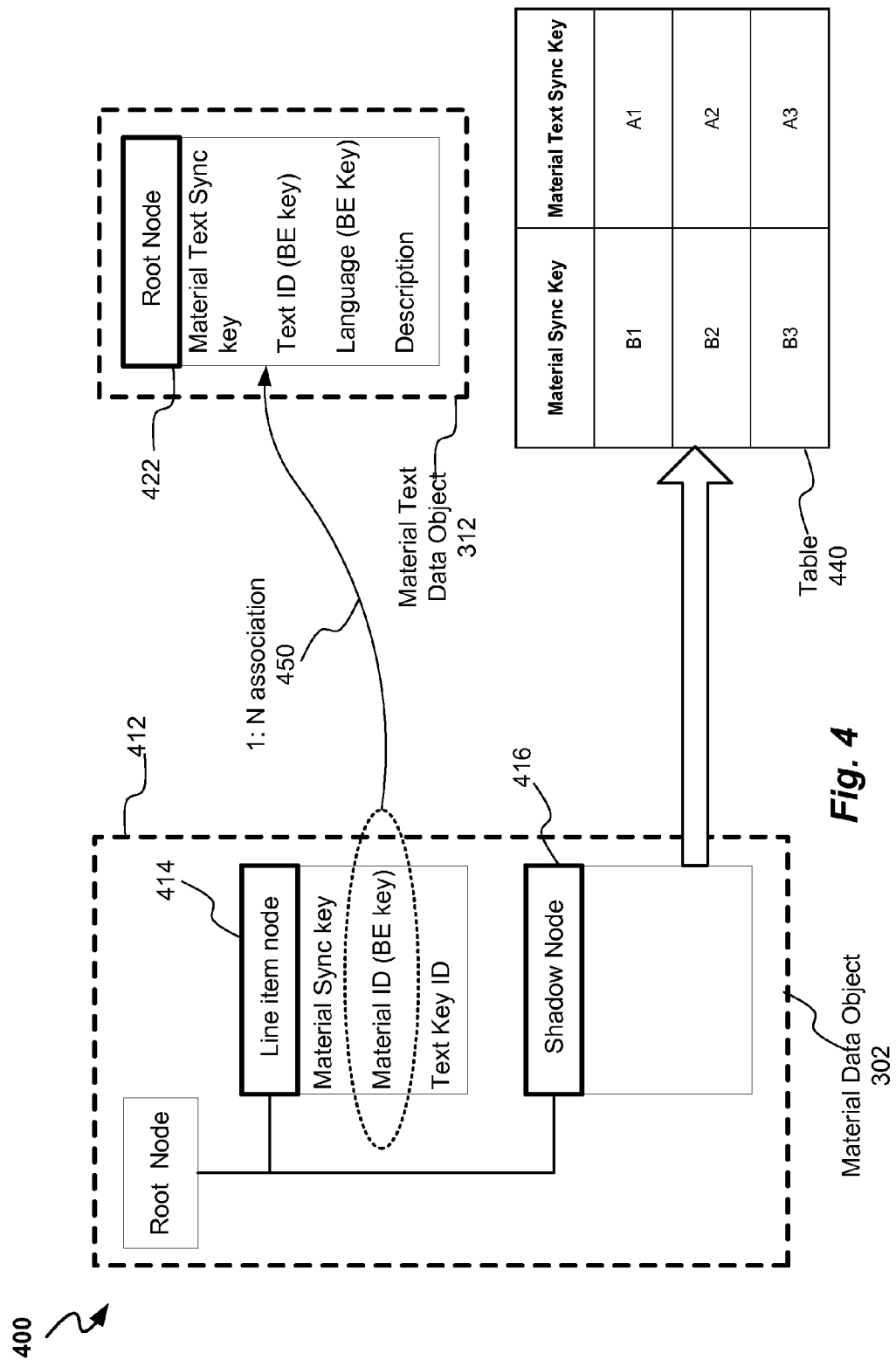
FIG. 4 illustrates de-normalizing of the 1:N relationship in FIG. 3 to create 1:1 associations according to an embodiment of the invention.

FIG. 4 illustrates de-normalizing 400 of the 1:N relationship in FIG. 3 to create 1:1 associations according to an embodiment of the invention. Material data object 302 as shown in FIG. 3 includes root node 412 and line item node 414. Material text data object 312 as shown in FIG. 3 includes root node 422. Line item node 414 is a child node to root node 412. Middleware table 330 as shown in FIG. 3 represents data stored in line item node 414 of material data object 302 and middleware table 340 as shown in FIG. 3 represents data stored in root node 422 of material text data object 312. Thus line item node 414 has a 1:N relationship 450 with root node 422 of material text data object 312. Records 304, 306 and 308 as shown in FIG. 3 of middleware table 330 are stored as separate instances of material data object 302. Similarly, records 314, 316 and 318 as shown in FIG. 3 of middleware table 340 are stored as separate instances of material text data object 312. Material ID is a backend key for line item node 414. Thus each material ID uniquely identifies a record in a backend data table for material data object 302. Similarly, text ID and language together is a composite backend key for material text data object 312. Each combination of text ID and the corresponding language uniquely identifies a record in a backend data table for material text data object 312.

Shadow node 416 is generated as a child node to root node 412 of material data object 302. The 1:N association 450 between line item node 414 and root node 422 of material text data object 312 is de-normalized and 1:1 associations are generated between the material sync key and material text sync keys of records 314, 316 and 318. The 1:1 associations between material sync key and material text sync keys is illustrated in table 440. Table 440 is typically a middleware table. The 1:1 associations are typically determined and stored at design time. Thus, during runtime, data distribution engine 144 as shown in FIG. 1 just needs to refer to the middleware table 440 of shadow node 416 and distribute data to the users depending upon the 1:1 associations.

FIG. 5 is a block diagram of an exemplary implementation of a distribution system 500 according to an embodiment of the invention. System 500 includes data consolidation engine 530, backend system 540 and distribution engine 550. Data consolidation engine 530 includes shadow node generator 504, data populator 506, de-normalizer 508, processor 510, memory 512 and control logic 502. Busses 522 connect shadow node generator 504, data populator 506, de-normalizer 508, processor 510, memory 512 and control logic 502 to system bus 520. Distribution engine 550 is coupled to data consolidation engine 530 through bus 570. Memory 512 stores data objects. Backend system 540 is coupled to data consolidation engine 530. Backend system 540 stores backend data tables. Data consolidation engine 530 evaluates the type of relationship existing between a node of a referring data object and a node of a referred data object. If the type of relationship existing between the nodes is a 1:N relationship, shadow node generator 504 generates a shadow node and stores the shadow node in memory 512. Responsive to the generation of the shadow node, de-normalizer 508 de-normalizes the 1:N relationship existing between the nodes and generates 1:1 associations between a sync key of the referring node and a set of sync keys of the referred node. The shadow node typically stores the de-normalized 1:1 associations. The shadow node data is typically the sync key associations and the sync keys of the referring and the referred nodes themselves. Data populator 506 populates the shadow node with data. The data is usually received from backend system 540. The shadow node data is generally populated whenever a new instance of the referred node or the referring node is added or whenever an existing instance of the referred node or referring node is deleted or updated. Distribution engine 550 connected to the devices through 560 distributes the data to the devices based upon the associations stored in the shadow node.

The particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a tangible machine-readable medium for storing the machine-executable instructions. The machine-readable medium may include flash memory, optical disks, CD-ROMs, DVD ROMs, RAMs, EPROMs, EEPROMs, magnetic or optical cards, or other type of tangible machine-readable media suitable for storing electronic instructions.

What is claimed is:

1. A computerized method for distributing backend object data from related nodes to consumer devices comprising:

generating a first database table linked to a first backend object, wherein the first database table corresponds to a first node of the first backend object;

generating a second database table linked to a second backed object, wherein the second database table corresponds to a second node of the second backed object, and wherein a 1:N relation is defined between the first node of the first backed object and the second node of the second backend object;

collecting data from a plurality of instances of the first backend object into the first database table based on predefined consumer device characteristics, wherein the data from each of the plurality of instances of the first backend object correspond to at least one row of the first database table;

collecting data from a plurality of instances of the second backend object into the second database table based on the predefined consumer device characteristics, wherein the data from each of the plurality of instances of the second backend object correspond to at least one row of the second database table, and wherein a row of the first database table corresponds to a plurality of rows of the second database table;

in a third database table, storing a 1:1 association between a first sync key uniquely identifying a row of the first database table, and a second sync key uniquely identifying a row of the second database table, wherein the 1:1 association is based on a designtime determination and derives from the 1:N relation between the first node and the second node;

consolidating the data stored in the row identified by the first sync key of the first database table and the data stored in the row identified by the second sync key of the second database table; and transferring the consolidated data to the consumer device over a computer network.

2. The method of claim 1, wherein the 1:1 association is between the first sync key and a third sync key, wherein the third sync key uniquely identifies another row of the second database table.

3. The method of claim 1, wherein the third database table is linked to a shadow node generated in the first backend object, wherein the shadow node stores a plurality of 1:1 associations between the first node and the second node, wherein the plurality of 1:1 associations result from de-normalization of the 1:N relation.

4. The method of claim 1, wherein the second sync key is a combination of two or more backend keys, wherein each of the one or more backend keys uniquely identifies a row in a backend database table underlying the node of the second backend object.

5. The method of claim 1, wherein the first node and the second node include one or more fields.

6. The method of claim 1, wherein the first node includes one or more fields for backend keys of the second node.

7. The method of claim 1, wherein the shadow node is populated with data if a new instance of the first node or the second node is received.

8. The method of claim 1, wherein the shadow node is populated with data if the first node or the second node is deleted or updated.

9. A tangible machine-accessible medium that provides non-transitory instructions that, when executed by a machine, cause the machine to perform operations comprising:

based on predefined consumer device characteristics, selecting data from a plurality of instances of a first backend object into a first database table corresponding to a first node of the first backend object, wherein the data from each of the plurality of instances of the first backend object corresponds to at least one row of the database table;

based on the predefined consumer device characteristics, selecting data from a plurality of instances of a second backend object into a second table corresponding to a second node of the second backend object, wherein a 1:N relationship is defined between the first node and the second node, the data from each of the plurality of instances of the second backend object corresponds to at least one row of the second database table, and a row of the first database table corresponds to a plurality of rows of the second database table;

form a third database table, reading a 1:1 association between a first sync key uniquely identifying a row of the first database table, and a second sync key uniquely identifying a row of the second database table, wherein the 1:1 association is based on a designtime determination, derives from de-normalization of the 1:N relation, and relates an instance of the plurality of instances of the first backend object and an instance of the plurality of instances of the second backend object; and transferring consolidated data extracted from the row identified by the first sync key of the first database table and the row identified by the second sync key of the second database table to the consumer device via a computer network.

10. The machine-accessible medium of claim 9, wherein the 1:1 association is between the first sync key and a third sync key uniquely identifying another row of the second database table.

11. The machine-accessible medium of claim 9, wherein the third database table corresponds to a shadow node, wherein the shadow node is a child node to the first node and stores a plurality of 1:1 association between the first node and the second node, the plurality of 1:1 associations result from de-normalization of the 1:N relation.

12. The machine-accessible medium of claim 9, wherein the second sync key is a combination of two or more backend keys, wherein each of the one or more backend keys uniquely identifies a an instance of the second backend object.

13. The machine-accessible medium of claim 9, wherein the first node and the second node include one or more fields.

14. The machine-accessible medium of claim 9, wherein the first node includes one or more fields for backend keys of the second node.

15. The machine-accessible medium of claim 9, wherein the shadow node is populated with data if a new instance of the first node or second node is received.

16. The machine-accessible medium of claim 9, wherein the shadow node is populated with data if the first node or the second node is deleted or updated.

17. A system comprising:
a memory for storing a program code; and
a processor coupled to the memory to execute the program code to:
based on predefined consumer device characteristics, selecting data from a plurality of instances of a first backend object into a first database table corresponding to a first node of the first backend object, wherein the data from each of the plurality of instances of the first backend object corresponds to at least one row of the database table;

based on the predefined consumer device characteristics, selecting data from a plurality of instances of a second backend object into a second table corresponding to a second node of the second backend object, wherein a 1:N relationship is defined between the first node and the second node, the data from each of the plurality of instances of the second backend object corresponds to at least one row of the second database table, and a row of the first database table corresponds to a plurality of rows of the second database table;

form a third database table, reading a 1:1 association between a first sync key uniquely identifying a row of the first database table, and a second sync key uniquely identifying a row of the second database table, wherein the 1:1 association is based on a designtime determination, derives from de-normalization of the 1:N relation, and relates the an instance of the first node and an instance of a plurality of instances of the second node; and transferring consolidated data extracted from the row identified by the first sync key of the first database table and the row identified by the second sync key of the second database table to the consumer device via a computer network.

18. The system of claim 17, wherein the memory comprises a data populator for populating a shadow node of the first backend object with data when the instance of the first node or the instance of the second node is updated or deleted, or when a new instance of the first node or a new instance of instance of the second node is received.

19. The system of claim 17, wherein the memory comprises a shadow node generator for generating a shadow node as a child node to the first node.

20. The system of claim 17, wherein the memory comprises a normalizer for de-normalizing the 1:N relation to generate the 1:1 association between an instance of the first node and an instance of the second node.

* * * * *